(12) United States Patent
Daugherty et al.

(10) Patent No.: US 12,702,975 B2
(45) Date of Patent: Aug. 11, 2026

(54) METHODS AND DEVICES FOR LATERAL FLOW ANALYTE ASSAYS

(71) Applicant: DIAGNOSTIC CONSULTING NETWORK, LLC, Carlsbad, CA (US)

(72) Inventors: Brian Taylor Daugherty, Carlsbad, CA (US); William Patrick Coffey, Carlsbad, CA (US)

(73) Assignee: DIAGNOSTIC CONSULTING NETWORK, LLC, Carlsbad, CA (US)

( * ) Notice: Subject to any disclaimer, the term of this patent is extended or adjusted under 35 U.S.C. 154(b) by 741 days.

(21) Appl. No.: 18/052,445

(22) Filed: Nov. 3, 2022

(65) Prior Publication Data

US 2023/0135843 A1 May 4, 2023

Related U.S. Application Data

(60) Provisional application No. 63/263,490, filed on Nov. 3, 2021.

(51) Int. Cl.

| | |
|---|---|
| ***B01L 3/00*** | (2006.01) |
| ***G01N 21/31*** | (2006.01) |
| ***G01N 21/64*** | (2006.01) |
| ***G01N 21/84*** | (2006.01) |

(52) U.S. Cl.

CPC ............ *B01L 3/5023* (2013.01); *G01N 21/31* (2013.01); *G01N 21/64* (2013.01); *G01N 21/8483* (2013.01); *B01L 2300/021* (2013.01); *B01L 2300/069* (2013.01); *B01L 2300/0825* (2013.01)

(58) Field of Classification Search

CPC ............. B01L 3/5023; B01L 2300/021; B01L 2300/069; B01L 2300/0825; B01L 3/545; G01N 21/31; G01N 21/64; G01N 21/8483

See application file for complete search history.

(56) References Cited

U.S. PATENT DOCUMENTS

| | | | |
|---|---|---|---|
| 4,703,017 | A | 10/1987 | Campbell et al. |
| 4,743,560 | A | 5/1988 | Campbell et al. |
| 4,942,522 | A | 7/1990 | Wilkie et al. |
| 4,956,302 | A | 9/1990 | Gordon et al. |
| 5,073,484 | A | 12/1991 | Swanson et al. |
| 5,120,643 | A | 6/1992 | Ching et al. |

(Continued)

FOREIGN PATENT DOCUMENTS

| | | | |
|---|---|---|---|
| EP | 0653625 | A1 | 5/1995 |
| EP | 0833145 | A1 | 4/1998 |

(Continued)

OTHER PUBLICATIONS

Bheemavarapu et al., IQVision: An Image-Based Evaluation Tool for Quantitative Lateral Flow Immunoassay Kits. Biosensors 2021;11(211):1-18.

(Continued)

*Primary Examiner* — Dennis White
(74) *Attorney, Agent, or Firm* — Michael A. Whittaker

(57) ABSTRACT

Lateral flow analyte test systems having a defined geometry that positions a light source at a position relative to a test strip so that a captured image of the test strip is not convoluted with specular reflection, and that permits the light source to illuminate the desired portion of the test strip without the creation of a shadow in the image by the optics of the test strip reader.

21 Claims, 9 Drawing Sheets

(56) References Cited

U.S. PATENT DOCUMENTS 5,252,496 A 10/1993 Kang et al.
5,559,041 A 9/1996 Kang et al.
5,580,794 A 12/1996 Allen
5,591,645 A 1/1997 Rosenstein
5,602,040 A 2/1997 May et al.
5,622,871 A 4/1997 May et al.
5,654,162 A 8/1997 Guire et al.
5,656,448 A 8/1997 Kang et al.
5,656,503 A 8/1997 May et al.
5,714,389 A 2/1998 Charlton et al.
5,728,587 A 3/1998 Kang et al.
5,837,546 A * 11/1998 Allen ................. G01N 33/5438 422/403
5,989,921 A 11/1999 Charlton et al.
6,020,147 A 2/2000 Guire et al.
6,027,943 A 2/2000 Kang et al.
6,187,598 B1 2/2001 May et al.
6,228,660 B1 5/2001 May et al.
6,352,862 B1 3/2002 Davis et al.
6,485,982 B1 11/2002 Charlton
6,506,612 B2 1/2003 Kang et al.
6,534,320 B2 3/2003 Ching et al.
6,541,277 B1 4/2003 Kang et al.
RE38,430 E 2/2004 Rosenstein
6,737,277 B1 5/2004 Kang et al.
6,818,455 B2 11/2004 May et al.
2001/0008774 A1 7/2001 May et al.
2003/0143755 A1 7/2003 Davis et al.
2003/0207465 A1 11/2003 Davis et al.
2003/0219908 A1 11/2003 Davis et al.
2005/0244986 A1 11/2005 May et al.
2006/0040405 A1 2/2006 Charlton et al.
2007/0231922 A1 * 10/2007 Petruno .............. G01N 21/8483 436/514

FOREIGN PATENT DOCUMENTS

WO WO-2019215199 A1 * 11/2019 ......... G01N 15/0625
WO 2021102175 A1 5/2021

OTHER PUBLICATIONS

Edmund Optics, Schott OG-590 product page copyright 2023 accessed online at: www.edmundoptics.com/p/pg-590-254mmdia-longpass-filter/6550/ (1 page).

Omnivision OV9715 video description page, Dec. 10, 2021 accessed online at: https://www.ovt.com/sensors/OV9715.

Shenzhen JSD Optoelectronics Optical, JDS 1225 lens product page, copyright 2021 accessed online at: www.jsdoptical.com/products/show-237.html.

Vishay Product Page, UV SMD LED With Silicone Lens. Rev. 1.3, Feb. 23, 2023 accessed online at: https://www.vishay.com/docs/84374/vlmu1610-365-135.pdf (8 pages).

* cited by examiner

PCB 408
LED(s) 409
Image sensor 407
409
Lens mount 406
Lens 405
Filter mount 404
Filter 403
410
W
Light rays
Reflection point
Membrane 402
W
Cartridge
401

METHODS AND DEVICES FOR LATERAL FLOW ANALYTE ASSAYS

The present application claims the benefit of U.S. Provisional Patent Application 63/263,490 filed Nov. 3, 2021, from which priority is claimed and which is hereby incorporated in its entirety including all tables, figures and claims.

BACKGROUND OF THE INVENTION

The following discussion of the background of the invention is merely provided to aid the reader in understanding the invention and is not admitted to describe or constitute prior art to the present invention.

Lateral flow assay devices are widely used in many different areas of analytical chemistry and medicine, and have become the format of choice for tests such as immunoassays which are to be performed by relatively untrained users in a rapid testing protocol. Typically, the devices and methods allow for application of a sample to a lateral flow matrix. The sample flows along the lateral flow matrix, and one or more analyte components to be detected in the sample react with at least one reagent which is provided in or added to the lateral flow matrix. At least one reagent is typically immobilized in the device for reaction with the analyte component to be detected or a reagent thereof, and labels are typically employed to provide a detectable signal that can be used to measure the extent of reaction with an immobilized reagent. See, e.g., U.S. patents and patent application publications: U.S. Pat. Nos. 5,602,040; 5,622,871; 5,656,503; 6,187,598; 6,228,660; 6,818,455; 2001/0008774; 2005/0244986; U.S. Pat. No. 6,352,862; 2003/0207465; 2003/0143755; 2003/0219908; U.S. Pat. Nos. 5,714,389; 5,989,921; 6,485,982; Ser. No. 11/035,047; U.S. Pat. Nos. 5,656,448; 5,559,041; 5,252,496; 5,728,587; 6,027,943; 6,506,612; 6,541,277; 6,737,277B1; 5,073,484; 5,654,162; 6,020,147; 4,956,302; 5,120,643; 6,534,320; 4,942,522; 4,703,017; 4,743,560; 5,591,645; and RE 38,430; and PCT patent application PCT/US2020/061344.

Lateral flow assay devices may comprise a housing having a sample port and a result window downstream of the sample port, and, optionally, a control window separate from the result window. The sample port is adapted to receive a quantity of liquid buffer or sample applied thereto which traverses a lateral flow path via a bibulous matrix or capillary material within the housing, extending from the sample port to a downstream location. The housing may be formed of any suitable material, an example of which comprises molded plastic, and is preferably sufficiently rigid to provide support and stability for the lateral flow path or paths housed therein.

Electronic readers for use in combination with lateral flow assay devices are also known. These readers measure the detectable label that is used for determining the concentration and/or amount of analyte in a fluid sample. EP653625 discloses such a device which uses an optical method in order to determine the result. Typically, an assay test strip is inserted into a reader such that the strip is aligned with optics provided by reader. Light from a source of electromagnetic radiation, such as a light emitting diode (LED), laser, etc., is directed toward the test strip at the detection (and optionally control) zone and reflected or transmitted or fluoresced light is detected by a photodetector in the reader. In certain readers, the reader will have more than one LED, and a corresponding photodetector is provided for each of the plurality of LED's.

An important consideration in assay reading devices of this type is the requirement that the assay reader and the test strip are carefully aligned. This is because the visible signal formed in the detection zone (and the control zone, if present) is fairly narrow (about 1 mm wide), so a small displacement of the detection or control zone relative to the respective photodetector may significantly affect the reading made by the photodetector. In addition, it is generally important that the photodetector is as close as possible to the test strip, because the amount of light which is 'captured' by the photodiode is fairly small, and the signal intensity normally obeys the inverse square law, so that it diminishes rapidly as the separation between the test strip and the photodetector increases.

In some cases, the reader and the lateral flow test device are provided as a single device. For example, U.S. Pat. No. 5,580,794 discloses a fully disposable integrated assay reader and lateral flow assay test strip, whereby optics present in the reader enable the result to be determined optically using reflectance measurements.

An alternative solution is taught by EP 0833145, which discloses a test strip and assay result reader combination, wherein the assay result reading device can be successfully triggered to make a reading only when there is a precise three-dimensional fit between the test strip and the reader, thereby ensuring the correct alignment has been obtained.

Many lateral flow test devices are limited to answering yes/no questions such as those concerning pregnancy or influenza. That is, below a certain threshold of analyte concentration in the original sample, no detectable signal is perceived, and the result is interpreted to be negative. Above the threshold, the signal is detected, and a positive result is determined. Advantages of these tests are that they are relatively simple to perform and interpret, and relatively inexpensive to fabricate. However, to obtain quantitative or even semi-quantitative results, more sophisticated instruments are employed. Many important tests require a quantitative result, which is not always achievable in a lateral flow assay format.

SUMMARY OF THE INVENTION

It is an object of the present invention to provide improved lateral flow test devices and systems that can provide sensitive and accurate quantitative test results, and methods for the manufacture thereof.

In a first aspect, the invention relates to lateral flow analyte test and associated electronic reader. These devices comprise:

(a) a test device, comprising a test strip comprising a porous or bibulous lateral flow material, wherein a longitudinal axis of the test strip having a length l is defined from a proximal end of the test strip (at or near which the sample is applied) to a distal end of the test strip (wherein after the sample is applied, fluid flow through the test strip is in the proximal-to-distal direction), and a width axis of the test strip having a length w is defined perpendicular to the longitudinal axis from a first lateral edge of the test strip to a second lateral edge of the test strip, wherein l is greater than w and the longitudinal and width axes define a plane p, at least one test zone on the test strip comprising one or more reagents configured to bind for detection at least one analyte of interest from the sample immobilized at the at least one test zone between the proximal end and the distal end, and a generally rigid housing which supports the test strip, wherein at least a portion of the test strip comprising the test zone is visible through the housing;

(b) a test device reader, comprising an opening into which the test strip is inserted for generation of a detectable signal from the test zone, a substrate providing a surface configured to face the visible portion of the test strip comprising the at least one test zone and to be positioned at a vertical distance B above plane p during generation of the detectable signal, at least one light source affixed to the substrate surface, wherein the at least one light source is positioned at a location on the substrate that is configured and arranged to permit the at least one light source to illuminate the visible portion of the test strip comprising the at least one test zone with electromagnetic radiation and thereby generate the detectable signal, wherein the at least one light source is laterally displaced from the midline of the width axis of the test strip by a distance d, wherein d≥w, an optical stack affixed to the substrate surface, the optical stack comprising at least one image sensor positioned at a location on the circuit board that is approximately centered on the width axis of the test strip and that is distal to the at least one test zone relative to the longitudinal axis of the test strip, wherein the at least one image sensor is configured to capture the detectable signal from the visible portion of the test strip when illuminated by the electromagnetic radiation during generation of the detectable signal, a lens element configured to focus an image of the visible portion of the test strip onto the at least one image sensor, wherein lens extends below the circuit board toward plane p, wherein the lens extends a distance b below the circuit board that is less than B, wherein the at least one light source is located at a distance a from the optical stack and a distance A from the farthest point at the distal end of the visible portion of the test strip, and wherein a>b(A/B);

a processing component operably connected to the at least one light source and the at least one image sensor and configured to (i) control the illumination of the visible portion of the test strip by the light source, (ii) receive an electrical signal from the at least one image sensor resulting from the detectable signal, and (iii) convert the electrical signal into an assay result indicative of the presence or amount of the analyte of interest in the sample; and a display component operably connected to the processing component to display the assay result.

In a related aspect, the present invention provides a test device reader, comprising an opening into which a lateral flow test strip is inserted for generation of a detectable signal from a test zone of the test device, a substrate providing a surface configured to face a visible portion of the test strip comprising the at least one test zone and to be positioned at a vertical distance B above plane p during generation of the detectable signal, at least one light source affixed to the substrate surface, wherein the at least one light source is positioned at a location on the substrate that is configured and arranged to permit the at least one light source to illuminate the visible portion of the test strip comprising the at least one test zone with electromagnetic radiation and thereby generate the detectable signal, wherein the at least one light source is laterally displaced from the midline of the width axis of the test strip by a distance d, wherein d≥w, an optical stack affixed to the substrate surface, the optical stack comprising at least one image sensor positioned at a location on the circuit board that is approximately centered on the width axis of the test strip and that is distal to the at least one test zone relative to the longitudinal axis of the test strip, wherein the at least one image sensor is configured to capture the detectable signal from the visible portion of the test strip when illuminated by the electromagnetic radiation during generation of the detectable signal, a lens element configured to focus an image of the visible portion of the test strip onto the at least one image sensor, wherein lens extends below the circuit board toward plane p, wherein the lens extends a distance b below the circuit board that is less than B, wherein the at least one light source is located at a distance a from the optical stack and a distance A from the farthest point at the distal end of the visible portion of the test strip, and wherein a>b(A/B).

As described hereinafter, the position of the light source at a position where d≥w places any specular reflection off the test strip itself such that specular reflection is not included in the image recorded of the test strip. By placing the specular reflection off the test strip, the captured image of the test strip is not convoluted with that reflection. In certain embodiments, d is less than 2w. In preferred embodiments, d is about w, with "about w" meaning in this context within 10% of w, and more preferably within 5% of w, and is most preferably w. In certain embodiments, the point of specular reflection is located on the generally rigid housing.

As also described hereinafter, the relative position of the light source from the optical stack as being a>b(A/B) permits the light source to illuminate the desired portion of the test strip without the creation of a shadow in the image by the optical stack. Instead, any shadow created by the optical stack lies beyond the distal end of the desired portion of the test strip, preferably on the generally rigid housing. In certain embodiments, a is within 10% of b(A/B), and more preferably within 5% of b(A/B), and is most preferably b(A/B).

It will be apparent to the artisan from the description herein that the lateral displacement of the light source at a position where d≥w and a>b(A/B) also permits the light source to illuminate portions of the test strip that lie beyond this shadowed region, and the image sensor to capture images of these portions. Thus, these portions of the test strip, including the generally rigid housing, provide real estate to encode information related to the particular test strip, e.g., calibration information, lot numbers, expiration dates, the particular test performed by the test strip, etc., in a manner that can be read by the image sensor and interpreted by the processing component. This encoding can be in the form of, for example, text, 1- or 2-D bar codes, QR codes, etc., printed on the generally rigid housing during the manufacturing process.

The lateral flow analyte test devices of the present invention may provide a binary (threshold) result, a semi-quantitative result (meaning that the measurement of a quantity of material is accurate to within a range of values), or most preferably a quantitative result.

In certain embodiments the presence or amount of the at least one analyte of interest in the sample is measured by measuring an amount of reflectance by the material at the test zone of the electromagnetic radiation emitted from the light source, by measuring an amount of absorbance by the material at the test zone of the electromagnetic radiation emitted from the light source, by fluorescence of the material at the test zone excited by the electromagnetic radiation emitted from the light source, etc., depending on the type of detectable label used in the device. Suitable detectable labels known in the art include, but are not limited to, colloidal gold, fluorescent latex nanoparticles, quantum dots, europium chelates, etc.

The lateral flow analyte test devices can be configured to perform competitive or sandwich assay formats. Detectable species (e.g., antibodies to the analyte, a receptor for the analyte, complimentary oligonucleotides, or a molecule that competes with an analyte for binding to an analyte) can be noncovalently or covalently bound or attached to the detectable label of choice. In certain embodiments, the first bibulous material or the test strip comprises a labeled mobilizable reagent (e.g., a detectable species as described above) that binds to or competes with the at least one analyte of interest, and wherein the labeled mobilizable reagent binds at the test zone in an amount related to the presence or amount of the analyte.

By way of example, the at least one analyte of interest may form sandwich complexes with the labeled mobilizable reagent and with reagents immobilized at the at least one test zone.

In another example, the at least one analyte of interest may compete with the labeled mobilizable reagent for binding to reagents immobilized on the least one test zone.

In certain embodiments, the labeled mobilizable reagent comprises a metal colloid label. In other embodiments, the labeled mobilizable reagent comprises a particulate label such as a fluorophore or a fluorescing or absorbing nanoparticle.

In certain embodiments the test strip reader is provided in the form of a single instrument which also provides the processing component and the display component. In certain other embodiments, the processing component and/or the display component may be provided as separate instruments. For example, the test strip reader may communicate with an external processor in either a wired or wireless manner. Similarly, the processing component may also communicate with an external display component in either a wired or wireless manner for display of the assay result.

DETAILED DESCRIPTION OF THE INVENTION

Figure 1:
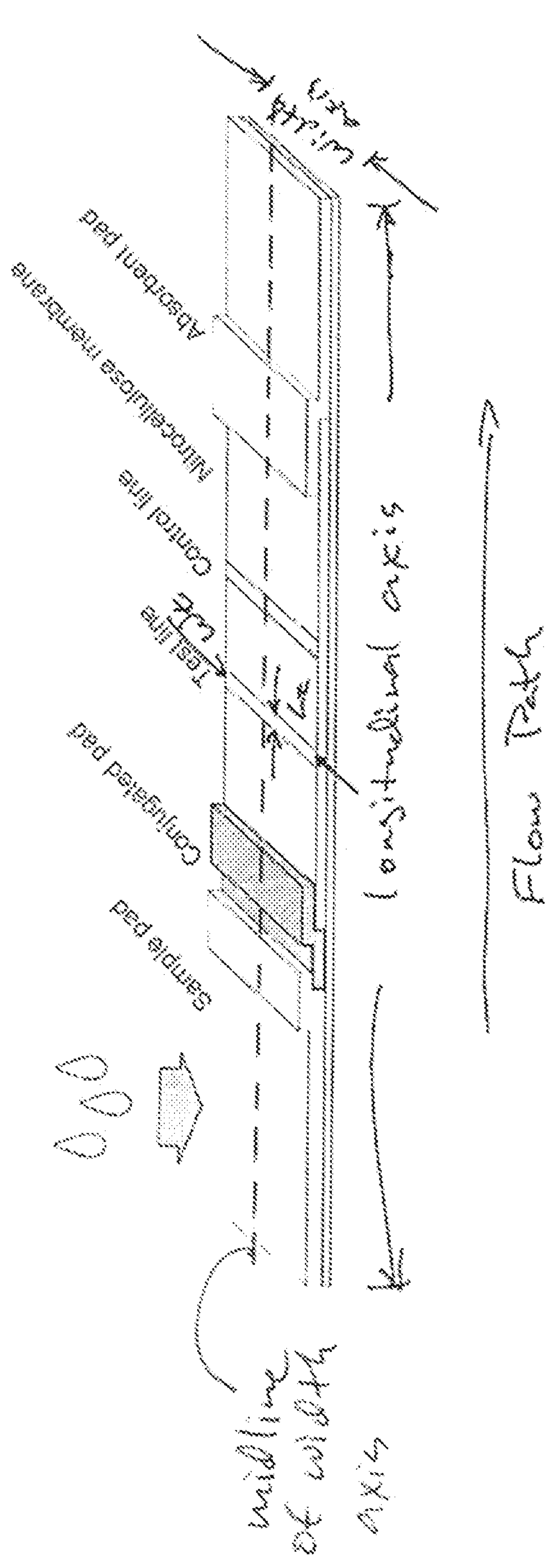
FIG. 1 depicts a typical lateral flow test strip configuration.

Lateral flow test devices have received wide acceptance in the diagnostic arts. These devices place a complicated set of reagents and manufactured elements into a simple, compact, easy to use package. See, e.g., Lateral Flow Immunoassay, Wong and Tse, eds., Humana Press, 2009. A test strip is shown in FIG. 1 in order to define certain elements of a typical test strip for use in the following discussion. A first bibulous material, often referred to as a sample pad, is provided at the proximal end of the test strip. It is this sample pad which receives the fluid sample to be tested. At the distal end of the test strip is a second bibulous material, often referred to as an absorbent pad, which operates to receive the sample fluid once it has passed through the test strip. The test strip, which may be a nitrocellulose membrane, is positioned between these two ends. The flow path of the sample is from the sample pad, through the nitrocellulose membrane, and into the absorbent pad. In doing so, the sample typically flows through a "conjugate pad", which is a portion of the device which contains a labeled reagent that binds to, or competes with, the analyte of interest. This labeled reagent is mobilized in the sample matrix so that it flows with the sample.

A test line is a location on the lateral flow membrane that binds the labeled reagent in an amount related to the presence or amount of the analyte of interest. While depicted as a single test line in FIG. 1, a lateral flow test strip may have multiple test lines, each of which is used to measure the presence or amount of a different analyte. One or more control lines are often employed, e.g., to act as an environmental control and to determine if the test has been successfully performed by the test strip. The test strip is typically held within a housing in order to provide protection to the test strip and for purposes of handling by the user.

Figure 2:
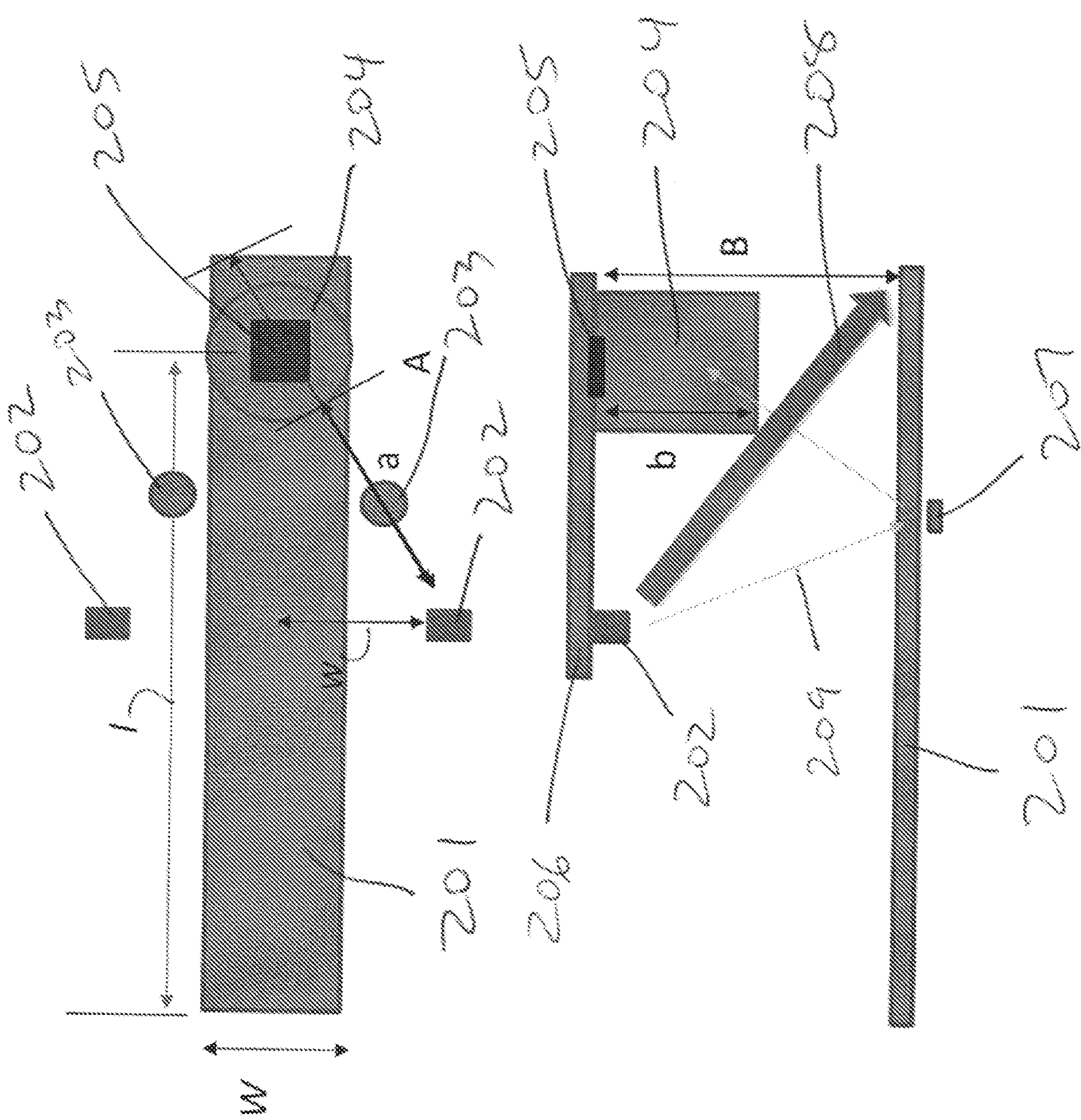
FIG. 2 depicts a test device of the invention in schematic form as a top view (top) and a side view (bottom)
Figure 3:
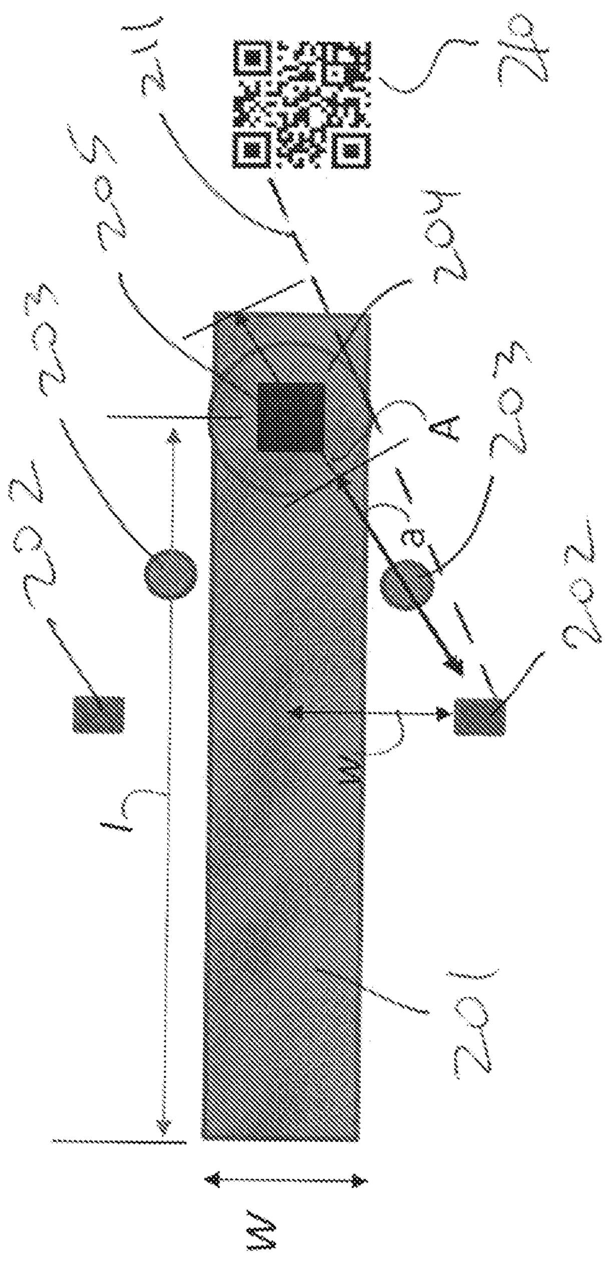
FIG. 3 depicts another embodiment of a test device of the invention in schematic form as a top view.

The principles of the present invention are depicted schematically in FIGS. 2 and 3.

Specular reflection is a "mirror" type of reflection that occurs at the interface of a medium. In a lateral flow test, this light reflected can be reflected from the surface of the test strip. It yields little information about the material other than its roughness, instead contributing a background noise signal that contaminates the actual assay signal.

In the present invention, the light source(s) are displaced laterally from the test strip itself. Referring to FIG. 2, a lateral flow test strip 201 is depicted having a proximal end at the left side of the drawing, a test zone 207 between this proximal end and the other, distal end, and a flow path from proximal end to distal end along lateral length l. The test strip is also defined by a width w.

A pair of electromagnetic radiation sources (e.g., light emitting diodes) 202 provide the light source for generating a signal from test zone 207, and detection is provided by a photodetector 205, in this case a CMOS imaging sensor. The configuration places photodetector downstream of the LED light sources. If the LED light sources were positioned over test strip 201, a point of specular reflectance would exist on the test strip at approximately the same location as test zone 207. By moving the LED light sources laterally away from the test strip, the points of specular reflection 203 are moved off the test strip itself. Because the photodetector is an imaging sensor and these points of specular reflection 203 are in a predictable location, the spurious reflection signal can be ignored.

Figure 4:
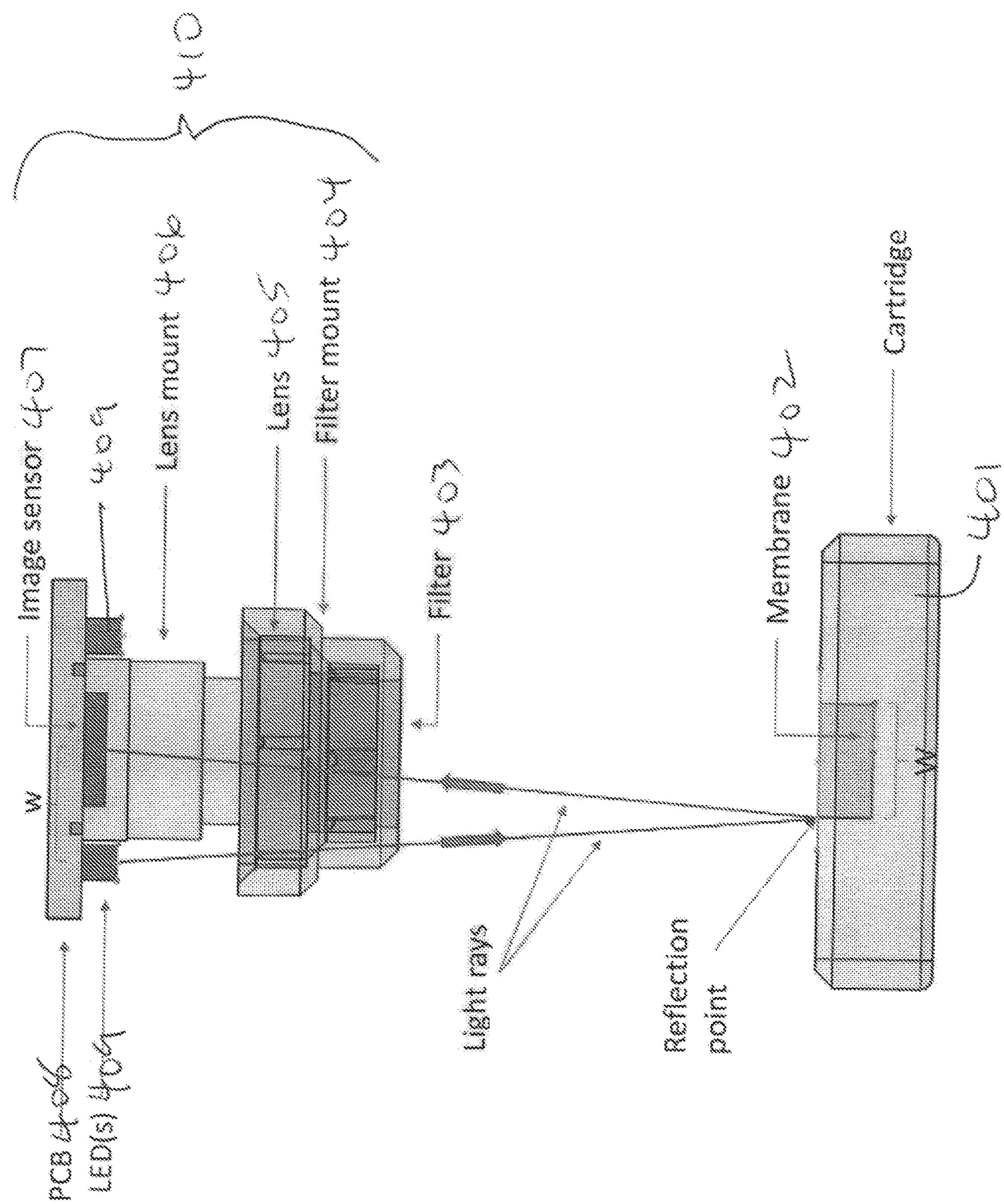
FIG. 4 depicts a more detailed view of the device elements as viewed looking down the lateral axis.
Figure 5:
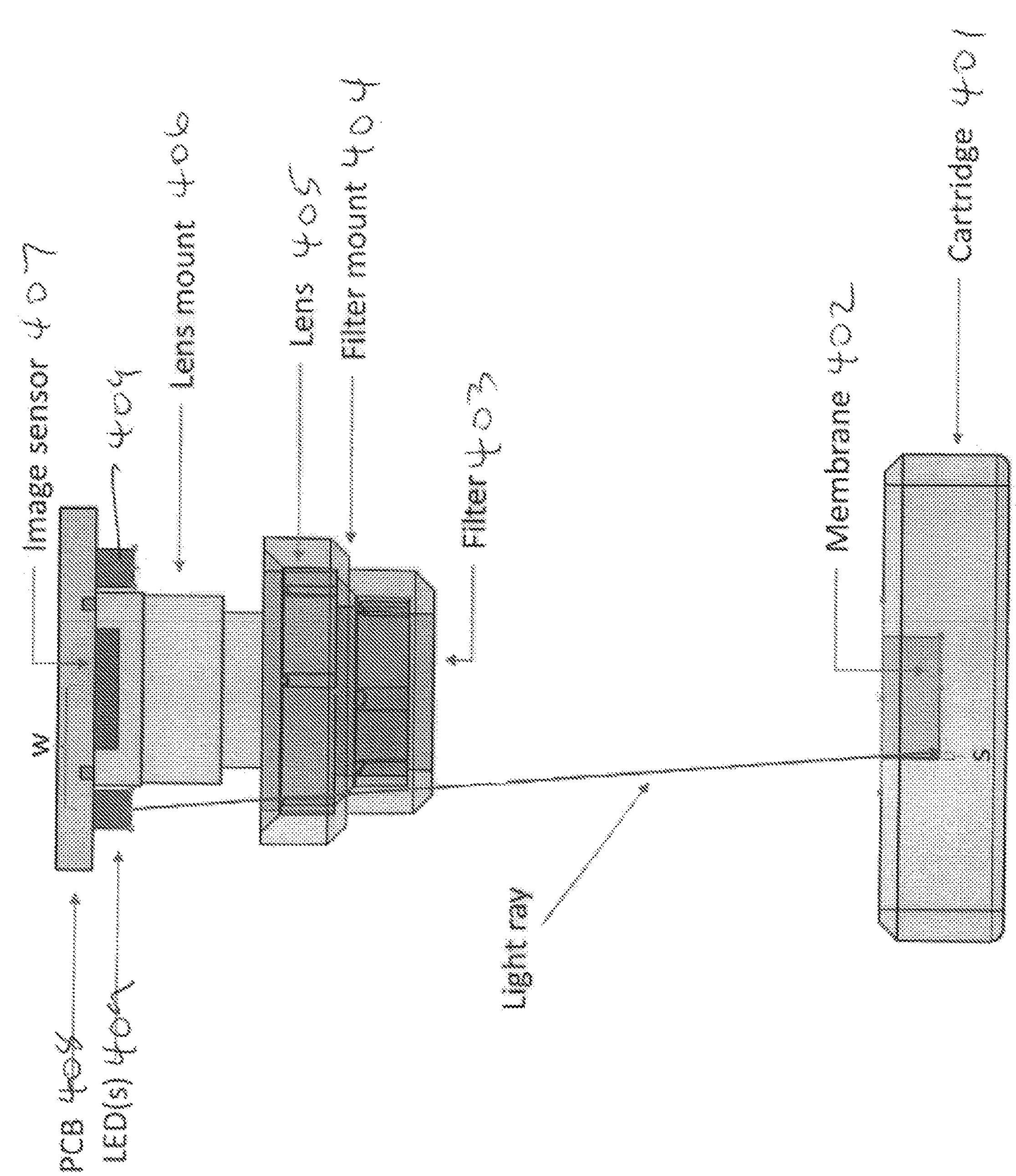
FIG. 5 depicts another more detailed view of the device elements as viewed looking down the lateral axis.

As shown in FIGS. 4 and 5, if the LED light source is moved laterally from the midline of the width axis by at least w, the reflection point will be at the extreme edge of the test strip or on the housing of the lateral flow test device 401 itself. Because the housing 402 typically positions the lateral flow membrane within a well in the cartridge, however, a shadow s from the edge of this well can be created by the edge of the well if the LED light source is moved laterally from the midline of the width axis by substantially more than w. For this reason, a preferred position of the LED light source(s) is moved laterally from the midline of the width axis by no more than 110% of w and preferably very close to, or at w.

The use of an imaging sensor as the photodetector, however, creates an additional set of problems, particularly in the context of fluorescence-based assays. Returning to FIGS. 2 and 3, an optical stack 204 containing at least a filter intended to remove reflected excitation wavelengths and/or to select the measured emission wavelengths and a focusing lens are provided as an optical stack 204 on top of imaging sensor 205. These components and the LED light sources 202 are positioned on a substrate 206 (e.g., a printed circuit board) facing the lateral flow membrane. The optical stack physically blocks the emitted light 209 at certain angles beyond the angle depicted by arrow 208, creating a shadowed area in the image.

As depicted, the height of the substrate 206 (and so the relative position of the LED light sources and the imaging detector) relative to the lateral flow membrane 201 surface is B. The optical stack 204 height relative to the substrate 206 (which may be on the order of more than 10 mm in height) is b. The distance from the LED light sources 202 to the edge of the optical stack 204 is a, and the distance from the LED light sources 202 to the furthest point on the lateral flow membrane 201 that is desired to be imaged is A. In order to ensure that light from the LED light sources 202 reaches the furthest point on the lateral flow membrane that is desired to be imaged, $a>b(A/B)$. Most preferably, a is no more than 110% of $b(A/B)$ and preferably very close to, or at $b(A/B)$.

Figure 6:
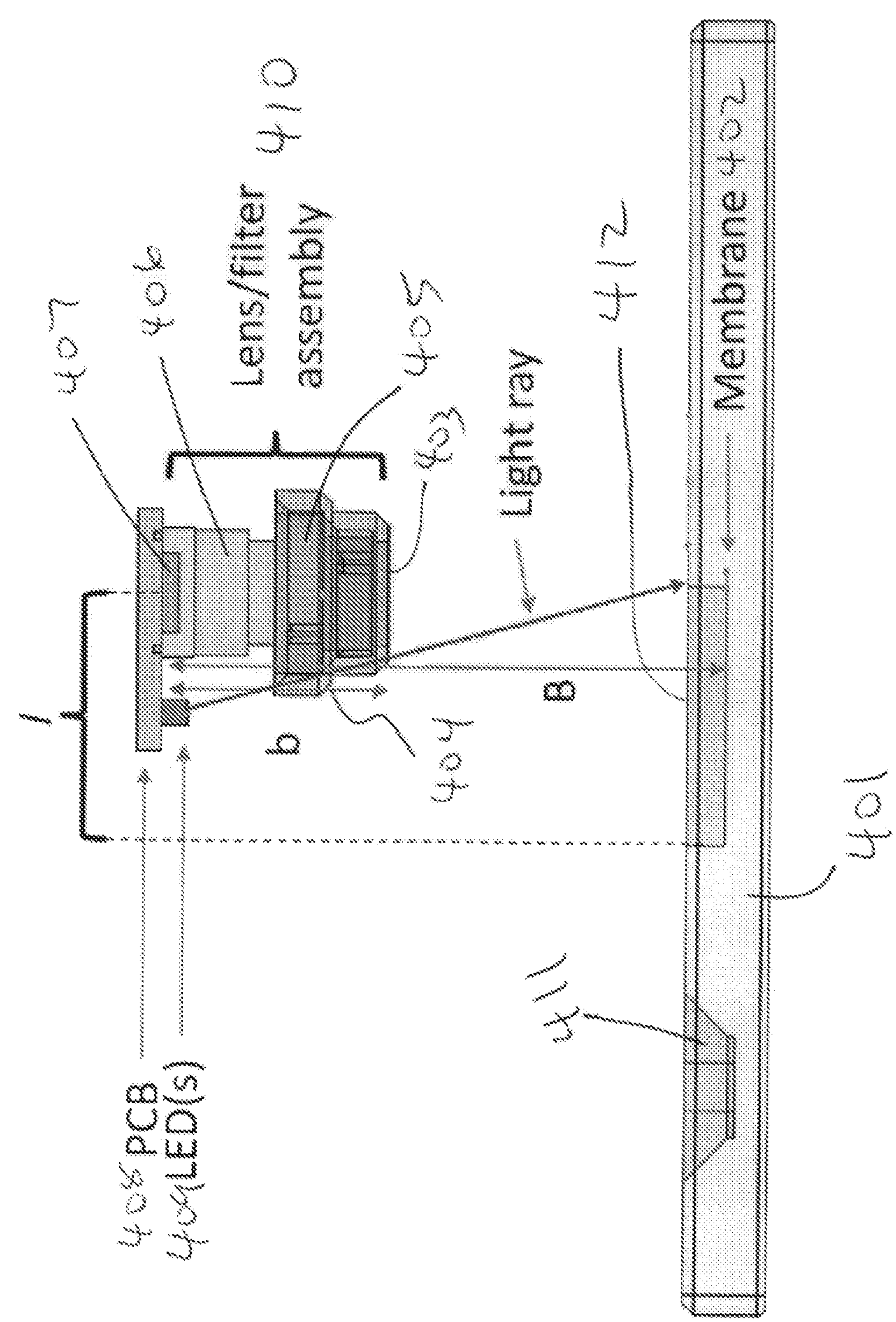
FIG. 6 depicts a more detailed view of the device elements as a cross-sectional side view.
Figure 7:
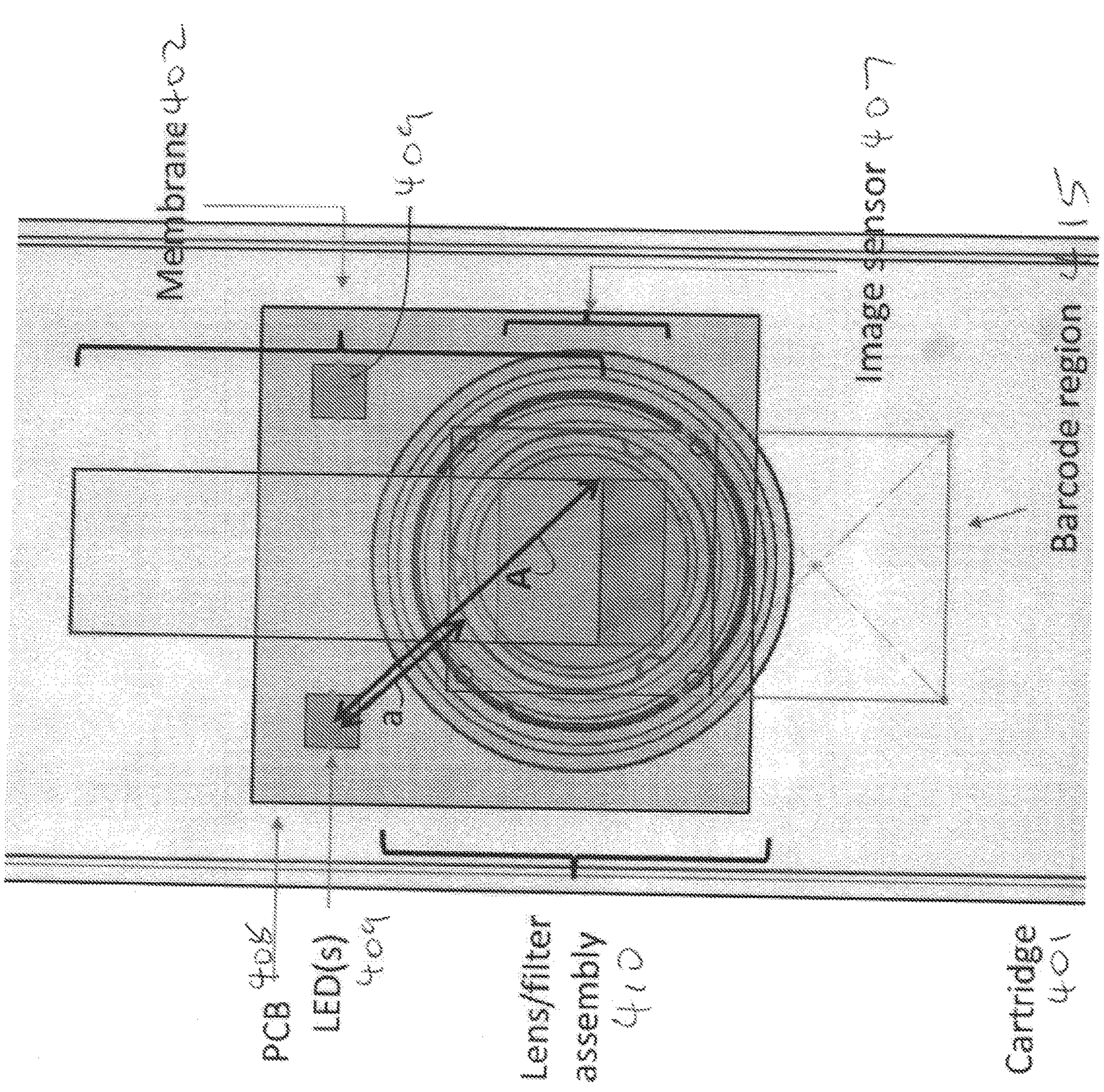
Figure 9:
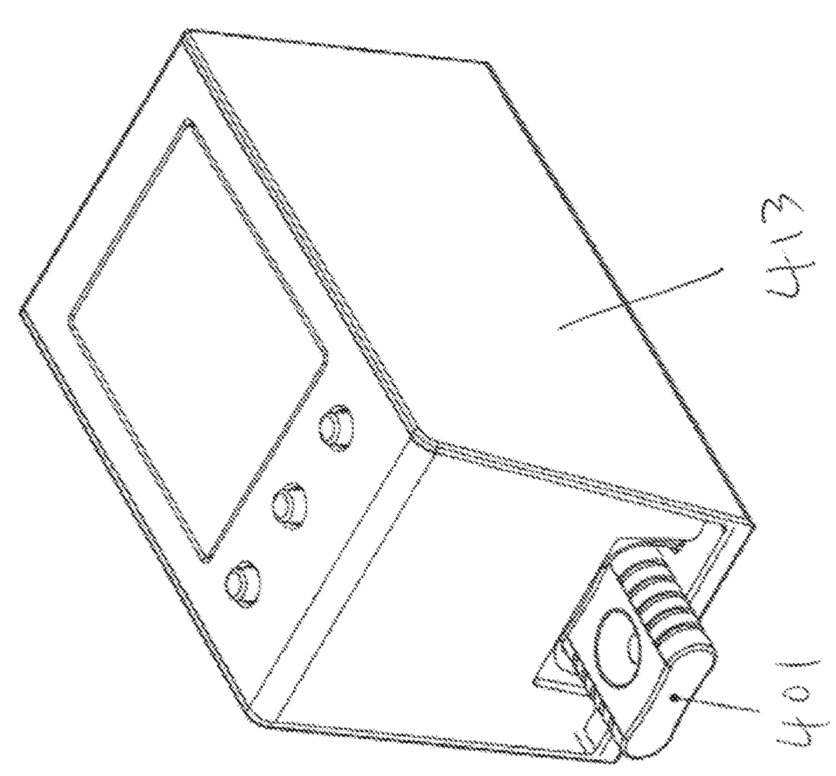
FIG. 9 depicts a test device and associated reader of the invention.
Figure 9:
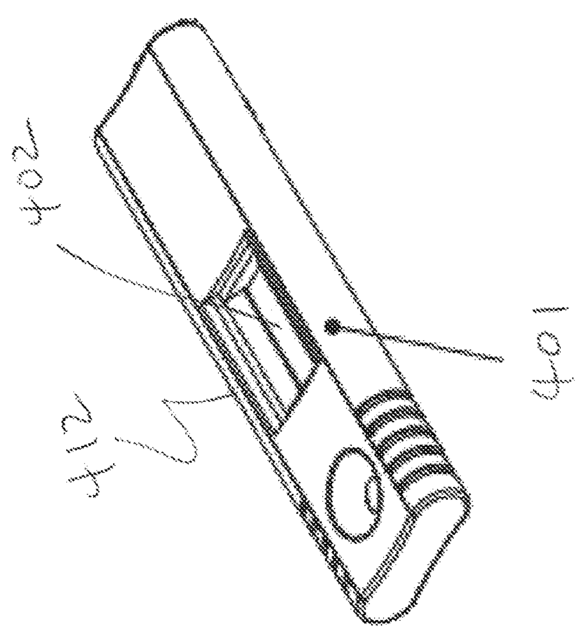

As shown in the FIGS. 6 and 9, such a housing 401 can comprise a top portion having an opening 411 into which a sample may be applied. The top can be mated to a bottom portion which holds the test strip lateral flow membrane 402. An opening or window 412 can be provided to permit the observation of at least a portion of the lateral flow membrane, either by eye or by an instrument provided for signal detection. When the test device is read by an external reader 413, limited or no electronics need to be provided within the housing. In the case of an integrated reader, housing 401 will also enclose the reader electronics necessary to read, interpret, and display the test result.

As will be apparent from FIG. 3, this positioning of the LED light sources 202 relative to the lateral flow membrane 201 and the optical stack 204 provides the ability to illuminate areas of the test device beyond the end of lateral flow membrane 201. That is, light which is at the angle depicted by dashed line 211 can illuminate encoded information depicted by 2-D bar code 210, and this encoded information can be read by imaging sensor 205 for interpretation by an associated computer processor. This encoded data may include, for example, an identification of the sample and sample type, an identification of the patient, an indication of the test or tests to be performed by the device, the type of reagents in a device, lot specific information such as calibration information and expiration dating, etc. This encoded information may be applied to the housing at the time of manufacture, or may be applied by an end user in the case of patient-specific information.

In the exemplary embodiments shown in FIGS. 4-7, an external reader 413 comprises one or more sources of electromagnetic radiation 409 (which may be referred to as "light sources") configured to illuminate the portion of the lateral flow membrane 402 visible through opening 412. Sources 409 are positioned on a substrate 408 such as a printed circuit board so that they face the visible portion of the lateral flow membrane 402 and can illuminate the test zone(s), control zone(s), etc. in order to generate a signal from the test device. In some embodiments, the one or more light emitters 409 may be comprised of LEDs. Selection of wavelengths of electromagnetic radiation may be achieved by one of ordinary skill in the art based on the label being utilized for the assay. Reflectance, conventional fluorescent detection, or time-resolved fluorescent detection may be used. This is not intended to be limiting. For example, the light from the LED may be at around 365 nm (UV) wavelength to excite a fluorescent response from a Europium label, with Europium emitting a fluorescent response at 615 nm (orange). In one example, a Vishay VLMU1610-365-135 UV LED (www.vishay.com/docs/84374/vlmu1610-365-135.pdf) may be used.

The detectable signal resulting from illumination of the portion of the lateral flow membrane visible through opening 412 may then be captured for analysis by a photodetector 407 positioned on substrate 408. While this may be captured by a simple photodiode, in preferred embodiments this signal capture photodetector 407 is in the form of an imaging sensor (e.g., using an imaging sensor such as an Omnivision OV09715 CMOS WXGA HD sensor (www.ovt.com/sensors/OV9715)). Because this exemplary design uses a 2D image sensor, it is able to tolerate some misalignment of the lateral flow membrane. The captured image can be analyzed e.g., by a processing component in the external reader or a separate analysis computer (e.g., a smartphone or other computing device). See, e.g., Bheemavarapu et al., Biosensors 2021, 11, 211 (doi.org/10.3390/bios11070211) which is hereby incorporated by reference in its entirety. Identification of the test and/or control lines in the image can be determined using a peak search algorithm on the captured image. It is noted that, while in the examples herein the light source(s) 409 and imaging sensor 407 are depicted on a single printed circuit board substrate, separate printed circuit boards may be used to provide the desired substrate. In the case of a substrate comprising separate circuit boards for, for example, light source(s) 409 and imaging sensor 407, it is preferable that the light source(s) 409 and imaging sensor 407 be maintained in the same lateral plane as if a single planar circuit board was used.

Figure 8:
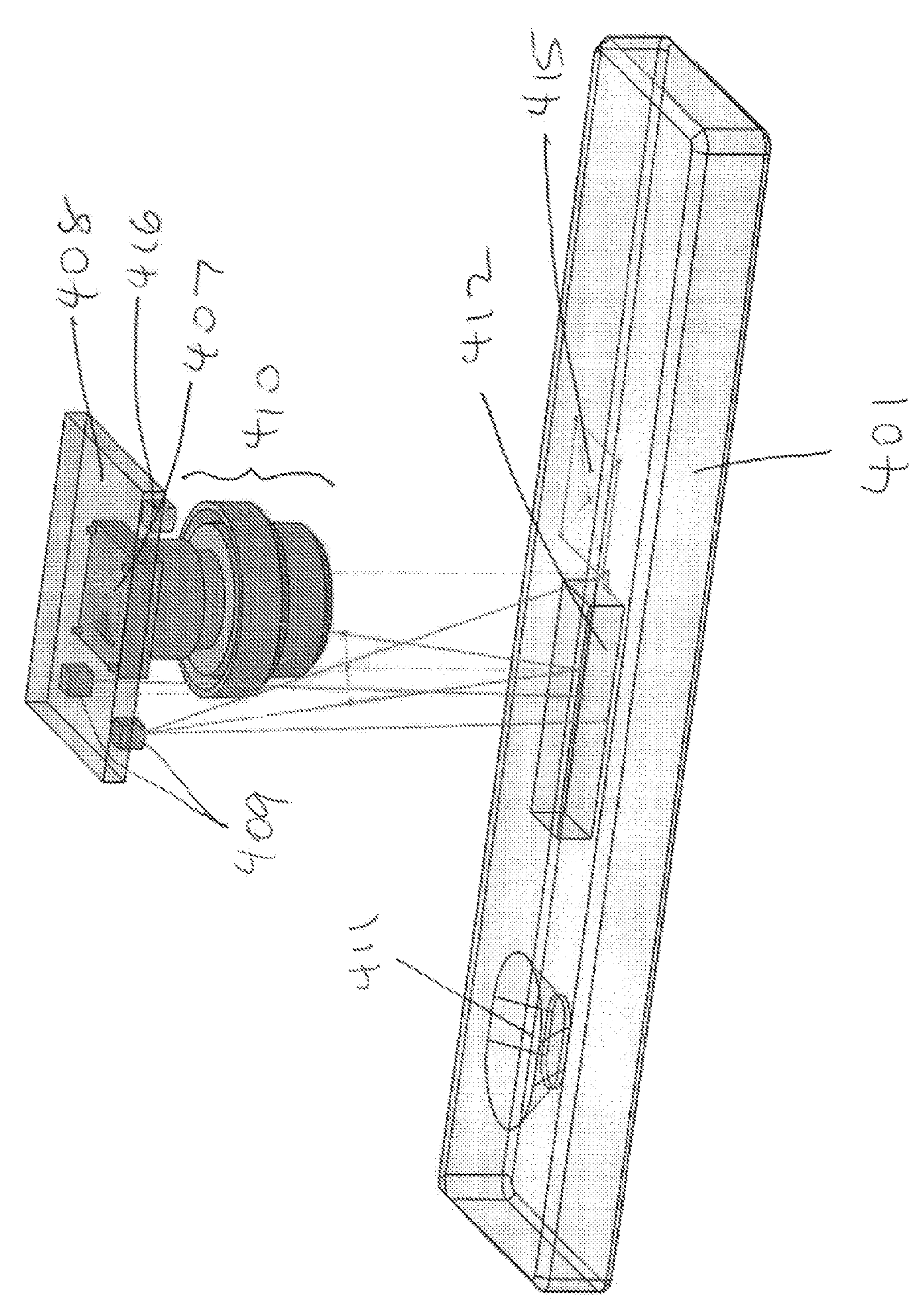
FIG. 8 depicts a further embodiment of a test device of the invention.

As shown in FIG. 8, in certain embodiments the encoded information (depicted in the figure by bar code region 415) may be illuminated by a light source (LED 416) which is distinct from LED light sources 409 that illuminate the test area of the lateral flow membrane 402. Nevertheless, the positioning of photodetector 407 and lens/filter assembly 410 permits bar code region 415 to be captured for analysis by the same imaging sensor as the test area.

In the case where time-resolved fluorescence detection is used, emission and excitation filters may not be required. In certain embodiments, however, an optical block 410 affixed to the substrate can provide a filter element 403. This filter element may be selected to remove the excitation wavelength in a fluorescence-based assay, to select a desired emission wavelength to reach the imaging sensor, or both, and may be provided as a single filter or multiple filters in a stack. A filter mount 404 can be provided to position the filter in the optical stack. Again, by way of example only and again considering a Europium label as an example, an Edmund Optics SCHOTT OG-590 longpass filter (www.edmundoptics.com/p/og-590-254mm-dia-longpass-filter/6550/) may be used.

In addition, because imaging sensors may have an image area that is on the order of a few millimeters while the desired field of view is much larger, a lens 405 may be provided as a component of the optical stack. As the required distance from an object and the desired FOV (typically the size of the object with additional buffer space) are known quantities, the lens focal length can be selected by the skilled artisan. A lens mount 406 can be provided to mount the filter in the optical stack. Such a mount is preferably adjustable in order to provide a focus adjustment. By way of example, a Shenzhen JSD Optoelectronics Optical JDS1225 lens and mount (www.jsdoptical.com/products/show-237.html) may be used.

By way of example only, a test device may be formed by introducing a moldable material into a mold assembly to form the test device lid and base; removing the test device lid and base from the mold assembly; and mating the test device lid to the test device base such that a sample receiving aperture overlies the first bibulous material and a test aperture overlies the one or more test zones. While the lid and base may be formed with discrete molds, the mold assembly may be configured as a single assembly, wherein the test device base and the test device lid are formed as a unitary part. To facilitate fit of the lid and base, the test device base and the test device lid may be formed as a unitary part connected by one or more flexible hinge regions (e.g. living hinges) configured to allow the test device lid to mate to the test device base.

The skilled artisan will understand that a number of polymers may be used to form the test device base, including thermoplastics, some thermosets, and elastomers. Common thermoplastics include PMMA, cyclic olefin copolymer, ethylene vinyl acetate, polyacrylate, polyaryletherketone, polybutadiene, polycarbonate, polyester, polyetherimide, polysulfone, nylon, polyethylene, and polystyrene. Common thermosets include polyesters, polyurethanes, duroplast, epoxy resins, and polyimides. This list is not meant to be limiting. Functional filler materials such as talc and carbon fibers can be included for purposes of improving stiffness, working temperatures, and part shrinkage.

Preferred Embodiments

The following are preferred embodiments of the present invention.

Embodiment 1. A lateral flow analyte test system, comprising:

(a) a test device, comprising a test strip comprising a porous or bibulous lateral flow material, wherein a longitudinal axis of the test strip having a length l is defined from a proximal end of the test strip (at or near which the sample is applied) to a distal end of the test strip (wherein after the sample is applied, fluid flow through the test strip is in the proximal-to-distal direction), and a width axis of the test strip having a length w is defined perpendicular to the longitudinal axis from a first lateral edge of the test strip to a second lateral edge of the test strip, wherein l is greater than w and the longitudinal and width axes define a plane p, at least one test zone on the test strip comprising one or more reagents configured to bind for detection at least one analyte of interest from the sample immobilized at the at least one test zone between the proximal end and the distal end, and a generally rigid housing which supports the test strip, wherein at least a portion of the test strip comprising the test zone is visible through the housing;

(b) a test device reader, comprising an opening into which the test strip is inserted for generation of a detectable signal from the test zone, a substrate providing a surface configured to face the visible portion of the test strip comprising the at least one test zone and to be positioned at a vertical distance B above plane p during generation of the detectable signal, at least one light source affixed to the substrate surface, wherein the at least one light source is positioned at a location on the substrate that is configured and arranged to permit the at least one light source to illuminate the visible portion of the test strip comprising the at least one test zone with electromagnetic radiation and thereby generate the detectable signal, wherein the at least one light source is laterally displaced from the midline of the width axis of the test strip by a distance d, wherein $d \geq w$, an optical stack affixed to the substrate surface, the optical stack comprising at least one image sensor positioned at a location on the circuit board that is approximately centered on the width axis of the test strip and that is distal to the at least one test zone relative to the longitudinal axis of the test strip, wherein the at least one image sensor is configured to capture the detectable signal from the visible portion of the test strip when illuminated by the electromagnetic radiation during generation of the detectable signal, a lens element configured to focus an image of the visible portion of the test strip onto the at least one image sensor, wherein lens extends below the circuit board toward plane p, wherein the lens extends a distance b below the circuit board that is less than B, wherein the at least one light source is located at a distance a from the optical stack and a distance A from the farthest point at the distal end of the visible portion of the test strip, and wherein $a > b(A/B)$;

a processing component operably connected to the at least one light source and the at least one image sensor and configured to (i) control the illumination of the visible portion of the test strip by the light source, (ii) receive an electrical signal from the at least one image sensor resulting from the detectable signal, and (iii) convert the electrical signal into an assay result indicative of the presence or amount of the analyte of interest in the sample; and a display component operably connected to the processing component to display the assay result.

Embodiment 2. The lateral flow analyte test system of embodiment 1, wherein $d \leq$ about 1.1w.

Embodiment 3. The lateral flow analyte test system of embodiment 1 or 2, wherein $a \leq$ about $1.1(b(A/B))$.

Embodiment 4. The lateral flow analyte test system of one of embodiments 1-3, wherein the assay result is a quantitative result.

Embodiment 5. The lateral flow analyte test system of one of embodiments 1-4, wherein the amount of the at least one analyte of interest in the sample is measured by a change in absorbance or fluorescence at the test zone.

Embodiment 6. The lateral flow analyte test system of one of embodiments 1-5, wherein the porous or bibulous lateral flow material comprises a labeled mobilizable reagent that binds to the at least one analyte of interest, and wherein the labeled mobilizable reagent and the at least one analyte of interest form sandwich complexes with the reagents configured to bind for detection the at least one analyte of interest immobilized at the at least one test zone.

Embodiment 7. The lateral flow analyte test system of one of embodiments 1-5, wherein the porous or bibulous lateral flow material comprises a labeled mobilizable reagent that competes with the at least one analyte of interest for binding to the reagents configured to bind for detection the at least one analyte of interest immobilized at the at least one test zone.

Embodiment 8. The lateral flow analyte test system of one of embodiments 6 or 7, wherein the labeled mobilizable reagent comprises a metal colloid label.

Embodiment 9. The lateral flow analyte test system of one of embodiments 6 or 7, wherein the labeled mobilizable reagent comprises a particulate label.

Embodiment 10. The lateral flow analyte test system of one of embodiments 6 or 7, wherein the labeled mobilizable reagent comprises a fluorescent label.

Embodiment 11. The lateral flow analyte test system of one of embodiments 1-10, wherein an encoded label is affixed or printed on the generally rigid housing which supports the test strip beyond the distal end of the visible portion of the test strip, and wherein the at least one image sensor is configured to capture both the detectable signal from the visible portion of the test strip and the encoded label, wherein the encoded label stores encoded information related to the test being performed, and wherein the processing component interprets the encoded information during a test procedure using the test device.

Embodiment 12. The lateral flow analyte test system of embodiment 11, wherein the encoded information comprises one or more of calibration information for the test procedure, a lot number for the test device, an expiration date for the test device, and an indication of the test performed through use of the test device.

Embodiment 13. The lateral flow analyte test system of embodiment 11 or 12, wherein the encoded information is stored as text, a 1-D bar code, a 2-D bar code, or a QR code printed on the generally rigid housing during the manufacturing process of the test device.

Embodiment 14. A lateral flow test device reader, comprising an opening into which a lateral flow test strip is inserted for generation of a detectable signal from a test zone of the test device, a substrate providing a surface configured to face a visible portion of the test strip comprising the at least one test zone and to be positioned at a vertical distance B above plane p during generation of the detectable signal, at least one light source affixed to the substrate surface, wherein the at least one light source is positioned at a location on the substrate that is configured and arranged to permit the at least one light source to illuminate the visible portion of the test strip comprising the at least one test zone with electromagnetic radiation and thereby generate the detectable signal, wherein the at least one light source is laterally displaced from the midline of the width axis of the test strip by a distance d, wherein $d \geq w$, an optical stack affixed to the substrate surface, the optical stack comprising at least one image sensor positioned at a location on the circuit board that is approximately centered on the width axis of the test strip and that is distal to the at least one test zone relative to the longitudinal axis of the test strip, wherein the at least one image sensor is configured to capture the detectable signal from the visible portion of the test strip when illuminated by the electromagnetic radiation during generation of the detectable signal, a lens element configured to focus an image of the visible portion of the test strip onto the at least one image sensor, wherein lens extends below the circuit board toward plane p, wherein the lens extends a distance b below the circuit board that is less than B, wherein the at least one light source is located at a distance a from the optical stack and a distance A from the farthest point at the distal end of the visible portion of the test strip, and wherein $a > b(A/B)$.

Embodiment 15. The lateral flow analyte test system of embodiment 14, wherein $d \leq$ about 1.1w.

Embodiment 16. The lateral flow analyte test system of embodiment 14 or 15, wherein $a \leq$ about 1.1(b(A/B)).

One skilled in the art readily appreciates that the present invention is well adapted to carry out the objects and obtain the ends and advantages mentioned, as well as those inherent therein. The examples provided herein are representative of preferred embodiments, are exemplary, and are not intended as limitations on the scope of the invention.

While the invention has been described and exemplified in sufficient detail for those skilled in this art to make and use it, various alternatives, modifications, and improvements should be apparent without departing from the spirit and scope of the invention. The examples provided herein are representative of preferred embodiments, are exemplary, and are not intended as limitations on the scope of the invention. Modifications therein and other uses will occur to those skilled in the art. These modifications are encompassed within the spirit of the invention and are defined by the scope of the claims.

It will be readily apparent to a person skilled in the art that varying substitutions and modifications may be made to the invention disclosed herein without departing from the scope and spirit of the invention.

All patents and publications mentioned in the specification are indicative of the levels of those of ordinary skill in the art to which the invention pertains. All patents and publications are herein incorporated by reference to the same extent as if each individual publication was specifically and individually indicated to be incorporated by reference.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

Other embodiments are set forth within the following claims.

We claim:

1. A lateral flow analyte test system, comprising:

(a) a test device, comprising a test strip comprising a porous or bibulous lateral flow material, wherein a longitudinal axis of the test strip having a length/is defined from a proximal end of the test strip (at or near which the sample is applied) to a distal end of the test strip (wherein after the sample is applied, fluid flow through the test strip is in the proximal-to-distal direction), and a width axis of the test strip having a length w is defined perpendicular to the longitudinal axis from a first lateral edge of the test strip to a second lateral edge of the test strip, wherein/is greater than w and the longitudinal and width axes define a plane p, at least one test zone on the test strip comprising one or more reagents configured to bind for detection at least one analyte of interest from the sample immobilized at the at least one test zone between the proximal end and the distal end, and a generally rigid housing which supports the test strip, wherein at least a portion of the test strip comprising the test zone is visible through the housing;

(b) a test device reader, comprising an opening into which the test strip is inserted for generation of a detectable signal from the test zone, a substrate comprising a circuit board providing a surface configured to face the visible portion of the test strip comprising the at least one test zone and to be positioned at a vertical distance B above plane p during generation of the detectable signal, at least one light source affixed to the substrate surface, wherein the at least one light source is positioned at a location on the substrate that is configured and arranged to permit the at least one light source to illuminate the visible portion of the test strip comprising the at least one test zone with electromagnetic radiation and thereby generate the detectable signal, wherein the at least one light source is laterally displaced from the midline of the width axis of the test strip by a distance d, wherein d≥w, an optical stack affixed to the substrate surface, the optical stack comprising at least one image sensor positioned at a location on the circuit board that is approximately centered on the width axis of the test strip and that is distal to the at least one test zone relative to the longitudinal axis of the test strip, wherein the at least one image sensor is configured to capture the detectable signal from the visible portion of the test strip when illuminated by the electromagnetic radiation during generation of the detectable signal, a lens element configured to focus an image of the visible portion of the test strip onto the at least one image sensor, wherein lens extends below the circuit board toward plane p, wherein the lens extends a distance b below the circuit board that is less than B, wherein the at least one light source is located at a distance a from the optical stack and a distance A from the farthest point at the distal end of the visible portion of the test strip, and wherein a>b(A/B);

a processing component operably connected to the at least one light source and the at least one image sensor and configured to (i) control the illumination of the visible portion of the test strip by the light source, (ii) receive an electrical signal from the at least one image sensor resulting from the detectable signal, and (iii) convert the electrical signal into an assay result indicative of the presence or amount of the analyte of interest in the sample; and a display component operably connected to the processing component to display the assay result.

2. The lateral flow analyte test system of claim 1, wherein d≤about 1.1w.

3. The lateral flow analyte test system of claim 2, wherein a≤about 1.1(b(A/B)).

4. The lateral flow analyte test system of claim 3, wherein the assay result is a quantitative result.

5. The lateral flow analyte test system of claim 4, wherein the amount of the at least one analyte of interest in the sample is measured by a change in absorbance or fluorescence at the test zone.

6. The lateral flow analyte test system of claim 5, wherein the porous or bibulous lateral flow material comprises a labeled mobilizable reagent that binds to the at least one analyte of interest, and wherein the labeled mobilizable reagent and the at least one analyte of interest form sandwich complexes with the reagents configured to bind for detection the at least one analyte of interest immobilized at the at least one test zone.

7. The lateral flow analyte test system of claim 6, wherein the labeled mobilizable reagent comprises a metal colloid label.

8. The lateral flow analyte test system of claim 6, wherein the labeled mobilizable reagent comprises a particulate label.

9. The lateral flow analyte test system of claim 6, wherein the labeled mobilizable reagent comprises a fluorescent label.

10. The lateral flow analyte test system of claim 5, wherein the porous or bibulous lateral flow material comprises a labeled mobilizable reagent that competes with the at least one analyte of interest for binding to the reagents configured to bind for detection the at least one analyte of interest immobilized at the at least one test zone.

11. The lateral flow analyte test system of claim 10, wherein the labeled mobilizable reagent comprises a metal colloid label.

12. The lateral flow analyte test system of claim 10, wherein the labeled mobilizable reagent comprises a particulate label.

13. The lateral flow analyte test system of claim 10, wherein the labeled mobilizable reagent comprises a fluorescent label.

14. The lateral flow analyte test system of claim 1, wherein an encoded label is affixed or printed on the generally rigid housing which supports the test strip beyond the distal end of the visible portion of the test strip, and wherein the at least one image sensor is configured to capture both the detectable signal from the visible portion of the test strip and the encoded label, wherein the encoded label stores encoded information related to the test being performed, and wherein the processing component interprets the encoded information during a test procedure using the test device.

15. The lateral flow analyte test system of claim 14, wherein the encoded information comprises one or more of calibration information for the test procedure, a lot number for the test device, an expiration date for the test device, and an indication of the test performed through use of the test device.

16. The lateral flow analyte test system of claim 15, wherein the encoded information is stored as text, a 1-D bar code, a 2-D bar code, or a QR code printed on the generally rigid housing during the manufacturing process of the test device.

17. A lateral flow test device reader, comprising an opening into which a test device comprising a lateral flow test strip is inserted for generation of a detectable signal from at least one test zone of the test device, a substrate comprising a circuit board providing a surface configured to face a visible portion of the test strip comprising the at least one test zone and to be positioned at a vertical distance B above plane p during generation of the detectable signal, at least one light source affixed to the substrate surface, wherein the at least one light source is positioned at a location on the substrate that is configured and arranged to permit the at least one light source to illuminate the visible portion of the test strip comprising the at least one test zone with electromagnetic radiation and thereby generate the detectable signal, wherein the at least one light source is laterally displaced from the midline of the width axis (w) of the test strip by a distance d, wherein d≥w, an optical stack affixed to the substrate surface, the optical stack comprising at least one image sensor positioned at a location on the circuit board that is approximately centered on the width axis of the test strip and that is distal to the at least one test zone relative to the longitudinal axis of the test strip, wherein the at least one image sensor is configured to capture the detectable signal from the visible portion of the test strip when illuminated by the electromagnetic radiation during generation of the detectable signal, a lens element configured to focus an image of the visible portion of the test strip onto the at least one image sensor, wherein lens extends below the circuit board toward plane p, wherein the lens extends a distance b below the circuit board that is less than B, wherein the at least one light source is located at a distance a from the optical stack and a distance A from the farthest point at the distal end of the visible portion of the test strip, and wherein a>b(A/B).

18. The lateral flow analyte test system of claim 17, wherein d≤about 1.1w.

19. The lateral flow analyte test system of claim 18, wherein a≤about 1.1(b(A/B)).

20. A lateral flow analyte test system, comprising:

(a) a test device, comprising a test strip comprising a porous or bibulous lateral flow material, wherein a longitudinal axis (I) and width axis (w) define plane p;

and a generally rigid housing supporting the test strip; and (b) a test-device reader, comprising a printed circuit board (PCB) substrate providing a surface configured to face the visible portion of the test strip at a vertical distance B above plane p;

at least one light source mounted on the PCB, laterally displaced from the midline of the width axis by a distance d, wherein d≥w;

an optical stack mounted on the PCB comprising a single image sensor and a lens extending below the PCB by a distance b, wherein b<B;

wherein the at least one light source is at a distance a from the optical stack and a distance A from the farthest distal point of the visible portion of the test strip, and a>b(A/B);

an encoded label on the housing beyond the distal end of the visible portion; and a processing component operably connected to the light source and the single image sensor;

wherein the lateral displacement d and the a, A, b, B relationships together define an illumination and imaging geometry that excludes specular reflection from plane p from the lens field-of-view, thereby enabling the single image sensor to concurrently capture (1) the detectable signal from the at least one test zone and (2) the encoded label without repositioning.

21. A lateral flow test device reader comprising:

an opening for a lateral-flow test strip wherein the test strip comprises a porous or bibulous lateral flow material, wherein a longitudinal axis (l) and width axis (w) define plane p; a printed circuit board (PCB) substrate positioned at distance B above plane p;

at least one light source mounted on the PCB, laterally displaced from the midline of the width axis w by a distance d, wherein d≥w; and an optical stack on the PCB comprising a single image sensor and a lens extending below the PCB by a distance b, wherein b<B;

wherein the light source is at distance a from the optical stack and distance A from the farthest distal point of the visible portion of the lateral-flow test strip, and a>b(A/B);

wherein the geometry excludes specular reflection from plane p from the lens field-of-view and the single image sensor is configured to concurrently capture both the assay region and an encoded label without repositioning.

* * * * *